United States Patent
Matsuhisa et al.

(10) Patent No.: US 10,209,479 B2
(45) Date of Patent: Feb. 19, 2019

(54) LENS DRIVE DEVICE, AND IMAGING DEVICE AND ELECTRONIC APPARATUS PROVIDED WITH SAME

(71) Applicant: Nidec Copal Corporation, Tokyo (JP)

(72) Inventors: Haruka Matsuhisa, Tokyo (JP); Kenzo Imai, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 15/580,203

(22) PCT Filed: Jun. 7, 2016

(86) PCT No.: PCT/JP2016/066953
§ 371 (c)(1),
(2) Date: Dec. 6, 2017

(87) PCT Pub. No.: WO2016/199775
PCT Pub. Date: Dec. 15, 2016

(65) Prior Publication Data
US 2018/0172944 A1    Jun. 21, 2018

(30) Foreign Application Priority Data
Jun. 12, 2015 (JP) .................... 2015-119837

(51) Int. Cl.
*G02B 7/02* (2006.01)
*G03B 5/00* (2006.01)
(Continued)

(52) U.S. Cl.
CPC ............ *G02B 7/026* (2013.01); *G02B 7/08* (2013.01); *G02B 27/646* (2013.01); *G03B 5/00* (2013.01);
(Continued)

(58) Field of Classification Search
CPC ........ G02B 7/026; G02B 7/08; G02B 27/646; G03B 5/00; G03B 5/02; G03B 2205/0015
(Continued)

(56) References Cited

U.S. PATENT DOCUMENTS

2013/0287383 A1    10/2013    Haruguchi et al.

FOREIGN PATENT DOCUMENTS

| JP | 2010-008550 | 1/2010 |
| JP | 2011-065140 | 3/2011 |

(Continued)

OTHER PUBLICATIONS

International Search Report issued by the International Searching Authority in International Application No. PCT/JP2016/066953, dated Sep. 6, 2016.

*Primary Examiner* — William Choi
(74) *Attorney, Agent, or Firm* — Troutman Sanders LLP

(57) ABSTRACT

A lens driving device having a leaf spring; a suspension wire, having one end thereof joined to the leaf spring; a supporting plate to which the other end portion of the suspension wire is joined; a lens retaining portion that is supported by the leaf spring and the suspension wire; and a driving portion for driving the lens retaining portion in a direction that is perpendicular to the optical axial direction of the lens. The leaf spring and/or the supporting plate is joined to the suspending wire through a joining material that is provided on a primary face, where the wettability of the primary face in respect to the joining material is greater than the wettability, in respect to the joining material, of the face on the opposite side from the primary face.

13 Claims, 19 Drawing Sheets

(51) Int. Cl.
  *G03B 5/02* (2006.01)
  *G02B 7/08* (2006.01)
  *G02B 27/64* (2006.01)

(52) U.S. Cl.
  CPC ........ *G03B 5/02* (2013.01); *G03B 2205/0015* (2013.01)

(58) Field of Classification Search
  USPC .................................. 359/811, 819, 822–824
  See application file for complete search history.

(56) References Cited

FOREIGN PATENT DOCUMENTS

| | | |
|---|---|---|
| JP | 2012-007242 | 1/2012 |
| JP | 2013-228610 | 11/2013 |
| JP | 2014-062975 | 4/2014 |

41A, 41B, 41C, 41D

LENS DRIVE DEVICE, AND IMAGING DEVICE AND ELECTRONIC APPARATUS PROVIDED WITH SAME

CROSS-REFERENCE TO RELATED APPLICATIONS

This is a U.S. national phase application under 35 U.S.C. § 371 of International Patent Application No. PCT/JP2016/066953, filed Jun. 7, 2016, and claims benefit of priority to Japanese Patent Application No. 2015-119836, filed Jun. 12, 2015 and Japanese Patent Application No. 2015-119837, filed Jun. 12, 2015. The entire contents of these applications are hereby incorporated by reference.

FIELD OF TECHNOLOGY

The present invention relates to a lens driving device, and to an imaging device and electronic device provided therewith.

BACKGROUND

As driving devices for driving imaging lenses in imaging devices there are known lens driving devices equipped with camera shaking preventing mechanisms for preventing but camera shaking in the imaging device. For example, Japanese Unexamined Patent Application Publication 2011-65140 discloses a camera shake correcting device comprising a driving device for autofocusing.

In the camera shake correcting device of Japanese Unexamined Patent Application Publication 2011-65140, a driving device for autofocusing is supported, so as to be able to rotate, by a top leaf spring and a plurality of suspension wires. One end of each of suspension wire is inserted into a wire securing hole in the side leaf spring. The top leaf spring and the suspension wire are secured through soldering, an adhesive agent, or the like.

SUMMARY

When the suspension wire that is inserted into the wire securing hole is secured to the top leaf spring through soldering, the solder spreads along the suspension wire, changing the length of the part of the suspension wire that undergoes elastic deformation. Because of this, the lengths of the parts of the various suspension wires that undergo elastic deformation will differ, making it difficult for the camera shake correcting device to prevent camera shaking with high accuracy.

The present invention was created in contemplation of the situation set forth above, and the object thereof is to provide a lens driving device, and an imaging device and electronic device provided therewith, able to prevent camera shaking, doing so with high accuracy.

A lens driving device according to an aspect according to the present invention, in order to achieve the object set forth above, includes a leaf spring; a suspension wire wherein one end portion is joined to the leaf spring; a supporting plate to which the other end portion of the suspension wire is joined; a lens retaining portion for holding the lens, supported by the leaf spring and the suspension wire; and a driving portion for driving the lens retaining portion in a direction that is perpendicular to the optical axial direction of the lens, wherein: the leaf spring and/or the supporting plate is joined to the suspension wire through a joining material that is provided on a primary face; and the wettability of the primary face in respect to the joining material is higher than the wettability, in respect to the joining material, of the face that is on the opposite side from the primary face.

The leaf spring and/or the supporting plate may have a through hole; the suspension wire may be inserted into the through hole; and the primary face, on which the joining material is provided, may be the face on the opposite side of the faces wherein the leaf spring and the supporting plate face each other.

The joining material may be solder.

A frame for enclosing the lens retaining portion may be provided, wherein the lens retaining portion may be supported by the leaf spring and the suspension wire through the frame.

The surface of the primary face of the joining material may have, as a main component, gold, silver, tin, or copper; and the surface of the face on the side that is opposite from the primary face may have, as a main component, nickel or zinc.

The supporting plate and/or the leaf spring may have at least one layer that is gold plating, silver plating, tin plating, solder plating, copper plating, zinc plating, and/or nickel plating.

The leaf spring, the suspension wire, and the supporting plate may be electrically conductive.

The leaf spring may include a joining portion that has the primary face that is joined to the suspension wire through the joining material, and that is provided with the joining material; a connecting portion that protrudes from the outer edge of the joining portion; an outer peripheral portion that surrounds the joining portion and the connecting portion, and to which one end of the connecting portion is joined; and an arm portion that has a prescribed modulus of elasticity.

The position, in the circumferential direction of the outer peripheral portion, wherein the connecting portion is joined to the outer peripheral portion, may be the position that is furthest from the position to which the arm portion is joined to the outer peripheral portion.

The modulus of elasticity of the connecting portion may be greater than the prescribed modulus of elasticity of the arm portion.

The joining portion may have a through hole into which the suspension wire is inserted.

An imaging device according to another aspect according to the present invention is provided with a lens driving device as set forth above.

An electronic device according to a further aspect according to the present invention is provided with a lens driving device as set forth above.

Effects of the Invention

The present invention is able to prevent camera shaking, with high accuracy, through causing the length of the parts of the suspension wires that undergoes elastic deformation to be uniform.

BRIEF DESCRIPTIONS OF THE DRAWINGS

DETAILED DESCRIPTION

A lens driving device 100 according to the present embodiment will be explained in reference to FIG. 1 through FIG. 7.

Figure 1:
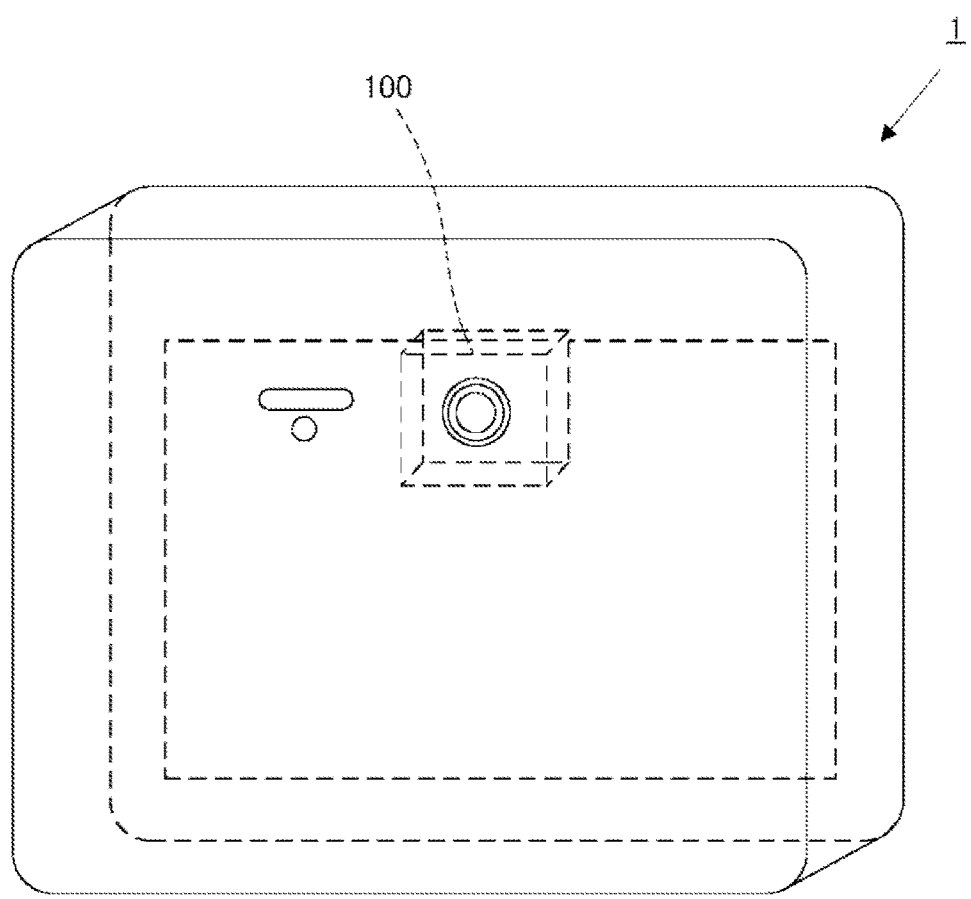
FIG. 1 is a schematic diagram depicting an imaging device provided with a lens driving device as set forth in an example according to the present invention.
Figure 2:
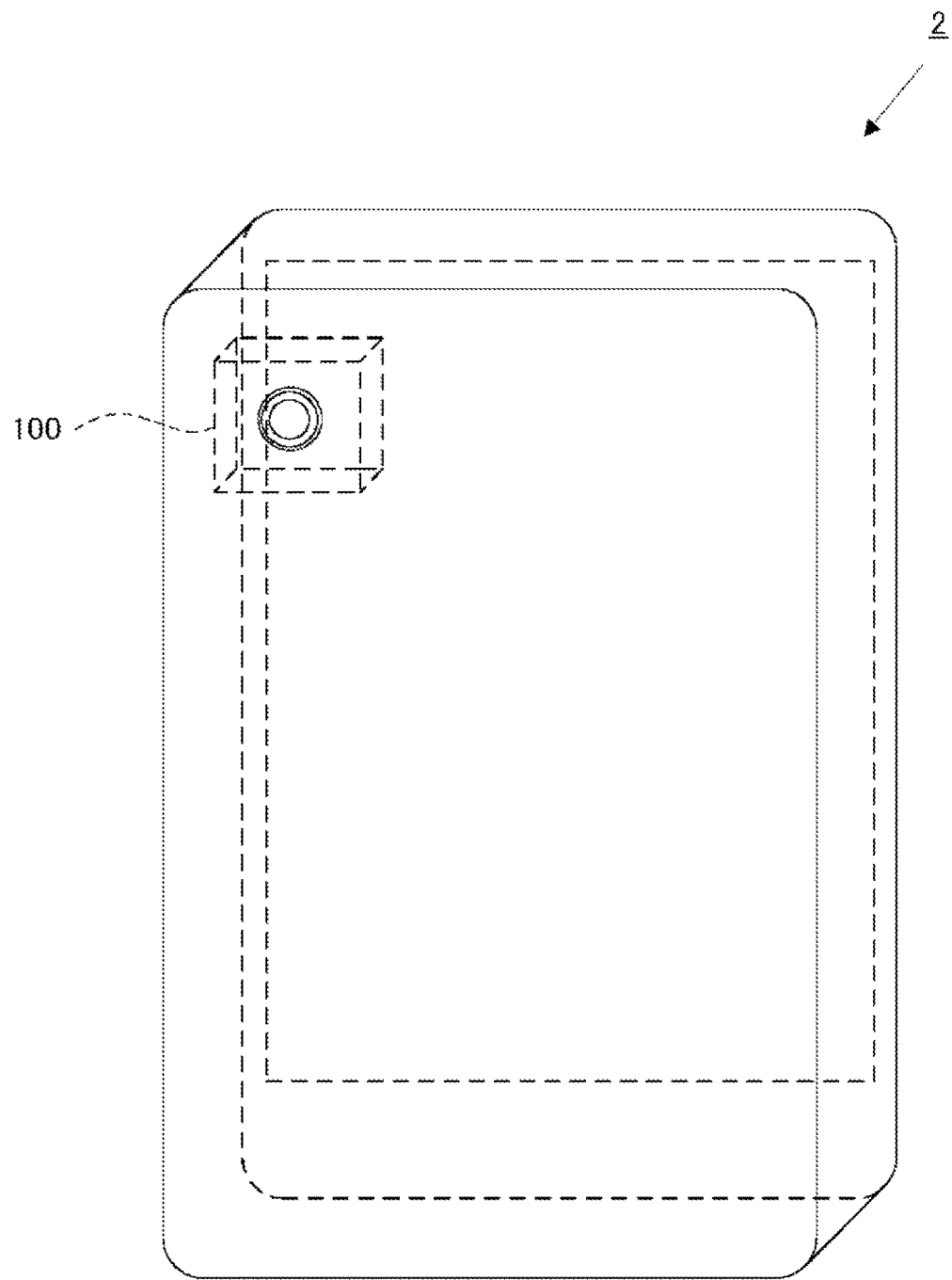
FIG. 2 is a schematic diagram depicting an electronic device provided with a lens driving device as set forth in the example according to the present invention.

The lens driving device 100, as illustrated in FIGS. 1 and 2, is provided in an imaging device 1, an electronic device 2, or the like, that has an imaging element. The lens driving device 100 comprises an automatic focal point adjusting (automatic focusing: AF) mechanism, and a camera shaking preventing mechanism (for example, an optical image stabilizer (OIS), for preventing camera shake. The imaging device 1 is a camera, which may be a digital camera, a monitoring camera, or the like. The electronic device 2 is a mobile terminal, which may be a smart phone, a laptop-type personal computer, or the like, that has an imaging function.

The imaging element may be, for example, a CCD (charge-coupled device), a CMOS (complementary metal oxide semiconductor), or the like.

Figure 3:
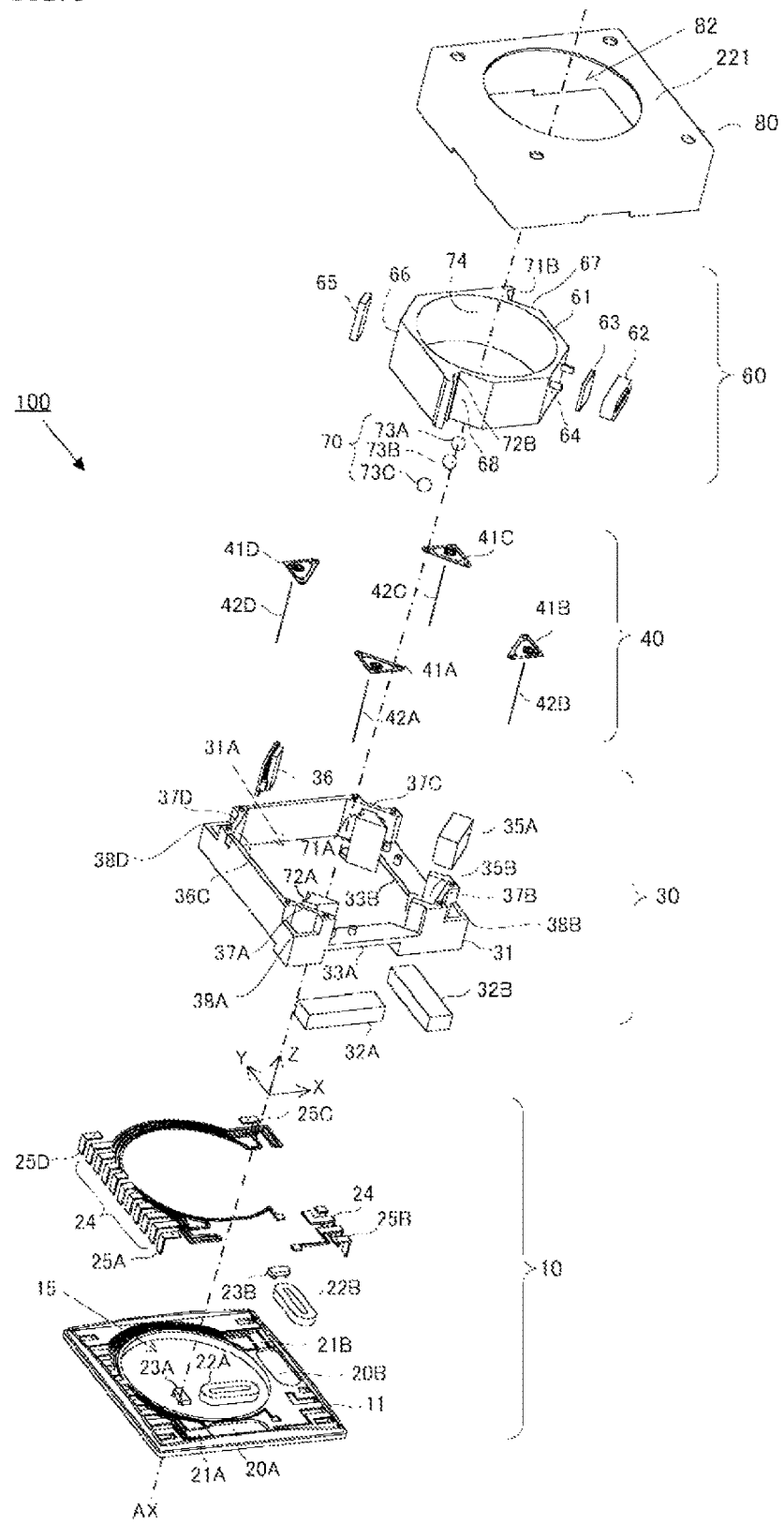
FIG. 3 is an assembly perspective diagram of a lens driving device according to the example according to the present invention.

The lens driving device 100, as illustrated in FIG. 3, comprises: a base portion 10, an OIS frame portion 30, a frame supporting portion 40, a lens retaining portion 60, a lens supporting portion 70, and a cover portion 80.

The base portion 10 is structured from a base 11, lead frames 24, 25A, 25B, 25C, and 25D, OIS coils 22A and 22B, and OIS position detecting portions 23A and 23B.

The OIS frame portion 30 is structured from a frame 31, OIS magnets 32A and 32B, an AF magnet 35A, and an AF position detecting portion 36. The OIS magnet 32A and the OIS coil 22A of the base portion 10 structure an OIS driving portion for driving the OIS frame portion 30. The OIS magnet 32B and the OIS coil 22B of the base portion 10 also structure an OIS guiding portion for driving the OIS frame portion 30. The OIS frame portion 30 holds a lens retaining portion 60. Moreover, the OIS frame portion 30 is driven by an OIS driving portion, to swivel, in a direction that is perpendicular to the optical axis AX of the lens in a lens barrel (not shown), which is held in the lens retaining portion 60. Through this, the lens driving device 100 prevents camera shake. Note that one or more lenses is provided in the lens barrel.

The frame supporting portion 40 is structured from suspension wires 42A, 42B, 42C, and 42D and top leaf springs 41A, 41B, 41C, and 41D. The frame supporting portion 40 supports the OIS frame portion 30 so as to enable rotation.

The lens retaining portion 60 is structured from a cylindrical member 61, an AF coil 62, a yoke 63, and an AF position detecting magnet 65. The cylindrical member 61 holds the lens barrel. The AF coil 62 and the AF magnet 35A of the OIS frame portion 30 structure an AF driving portion 92. The lens retaining portion 60 is driven by the AF driving portion 92, to move in the direction of the optical axis AX of the lens. The lens driving device 100 adjusts the focal point thereby.

Figure 6:
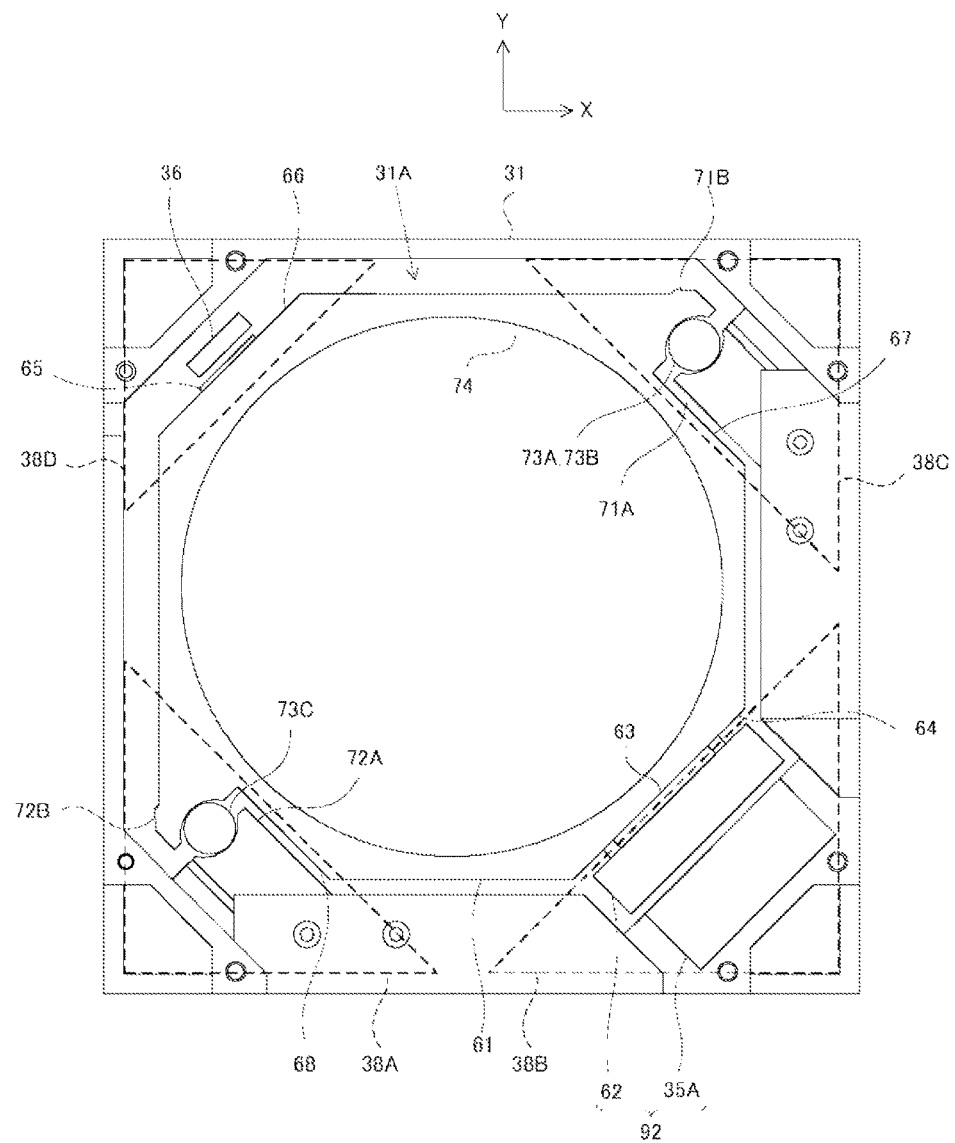
FIG. 6 is a schematic diagram depicting the arrangement of a lens holding portion as set forth in the example according to the present invention.

The lens supporting portion 70 is a set of bearings 73A and 73B, and a bearing 73C. The set of bearings 73A and 73B, and the bearing 73C, as illustrated in FIGS. 3 and 6, are disposed between the OIS frame portion 30 and the lens retaining portion 60. The lens supporting portion 70 supports the lens retaining portion 60.

Figure 4:
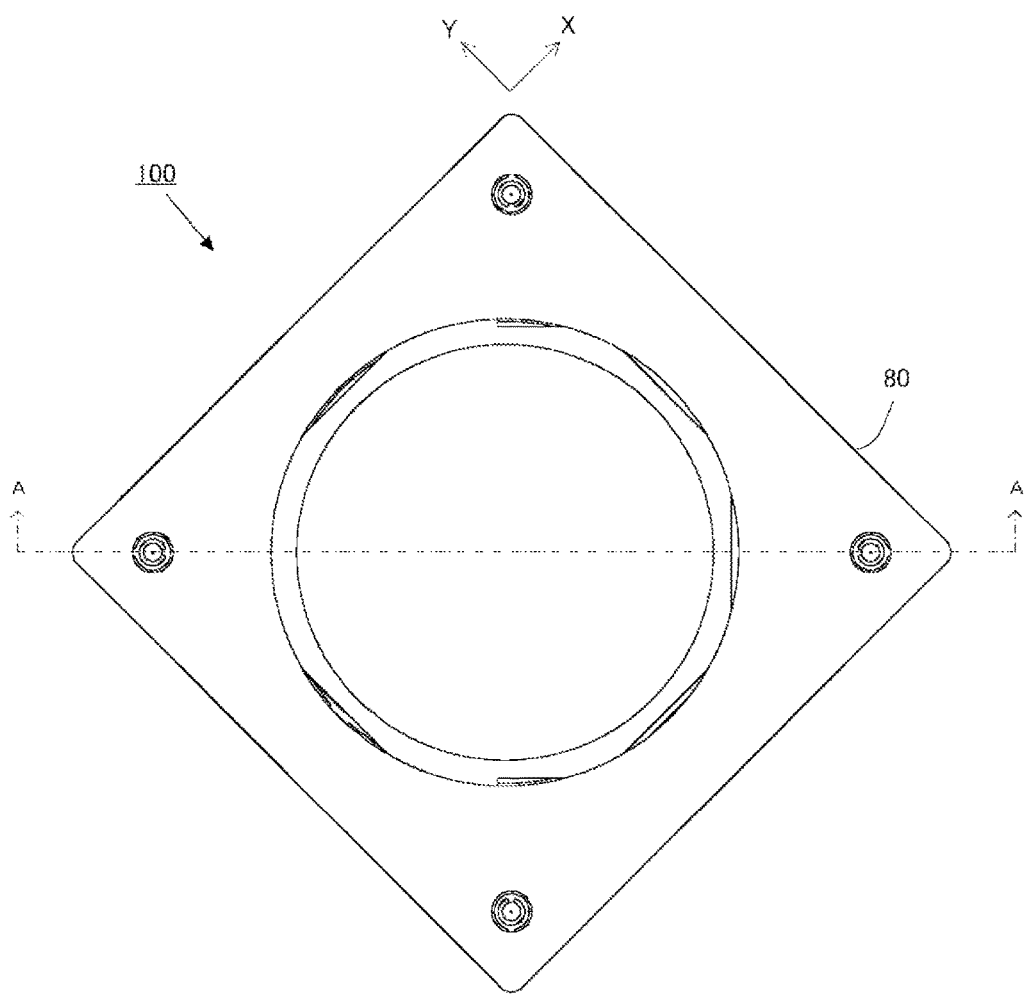
FIG. 4 is a plan view diagram of a lens driving device according to the example according to the present invention.
Figure 5:
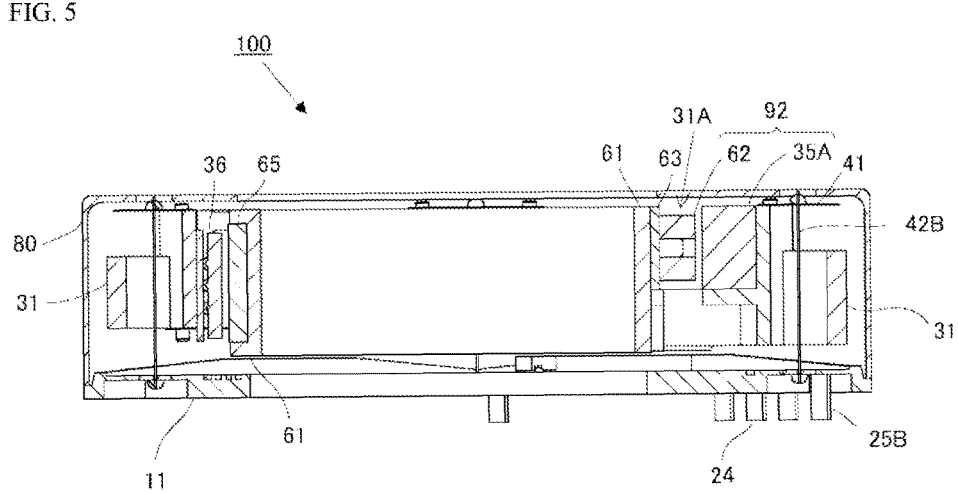
FIG. 5 is a cross-sectional view along the section A-A in the lens driving device depicted in FIG. 4.

A cover portion 80 is attached to a base 11 of the base portion 10 as shown in FIGS. 4 and 5. The cover portion 80 covers the OIS frame portion 30, the frame supporting portion 40, the lens retaining portion 60, and the lens supporting portion 70.

The specific structure of the lens driving device 100 will be explained below. Note that, for ease in understanding, the object side of the lens barrel, when viewed from the lens, will be explained as the "front," and the focusing side of the lens in the lens barrel will be explained as the "back." Moreover, the optical axis AX of the lens is defined as the Z axis, and directions that are perpendicular to the Z axis and perpendicular to each other are defined as the X axis and the Y axis.

The base portion 10 is structured from a rectangular base 11, lead frames 24, 25A, 25B, 25C, and 25D that are provided on the base 11, OIS coils 22A and 22B, and OIS position detecting portions 23A and 23B.

The base 11 has a circular opening portion 15 in the center portion thereof. The light from the imaging subject that passes through the lens of the lens barrel passes through the opening portion 15 to arrive at an imaging element (not shown) that is disposed therebehind. A cover portion 80 is attached to the base 11.

The respective OIS coils 22A and 22B are installed respectively in the supporting portions 20A and 20B. The supporting portions 20A and 20B are formed on the base 11 along two adjacent sides of the base 11. The OIS position detecting portions 23A and 23B are provided along respective supporting portions 21A and 21B that are adjacent to respective supporting portions 20A and 20B.

The OIS coil 22A generates a magnetic field for moving the OIS frame portion 30 in the Y axial direction. Moreover, the OIS coil 22B generates a magnetic field for moving the OIS frame portion 30 in the X axial direction. The OIS coils 22A and 22B respectively face the OIS magnets 32A and 32B of the OIS frame portion 30. The OIS coil 22A and the OIS magnet 32A structure an OIS driving portion for driving the OIS frame portion 30 in the Y axial direction. The OIS coil 22B and the OIS magnet 32B structure an OIS driving portion for driving the OIS frame portion 30 in the X axial direction. The driving of the OIS frame portion 30 and the camera shake prevention, by the OIS driving portion, will be described below. In addition, the OIS position detecting portions 23A and 23B face the respective OIS magnets 32A and 32B of the OIS frame portion 30. The OIS position detecting portion 23A detects the position of the OIS magnet 32A, in the Y axial direction, relative to the base portion 10. The OIS position detecting portion 23B detects the position of the OIS magnet 32B, in the X axial direction, relative to the base portion 10. Through this, the OIS position detecting portions 23A and 23B are able to detect the position of the OIS frame portion 30, in the X axial direction and the Y axial direction, relative to the base portion 10. The OIS position detecting portions 23A and 23B are, for example, Hall elements, or the like.

The lead frames 24, 25A, 25B, 25C, and 25D are formed from, for example, copper alloy, with nickel plating and gold plating applied sequentially thereto. The lead frames 25A, 25B, 25C, and 25D are provided at respective corners of the base 11. The suspension wires 42A, 42B, 42C, and 42D are joined respectively to the lead frames 25A, 25B, 25C, and 25D.

The individual lead frames 24, 25A, 25B, 25C, and 25D are connected to a controlling portion (not shown). Electric power or signals outputted from the controlling portion is inputted into the OIS coils 22A and 22B, the OIS position detecting portions 23A and 23B, the AF position detecting portion 36, and the AF coil 62 through the lead frames 24, 25A, 25B, 25C, and 25D, and an interconnection (not shown) that is joined to the lead frame 24 or the suspension wires 42A, 42B, 42C, and 42D. Moreover, the signals that are outputted from the OIS detecting portions 23A and 23B, and the AF position detecting portion 36, are also inputted into the controlling portion through the lead frames 24, 25A, 25B, 25C, and 25D, and the interconnection that is joined to the lead frame 24 or the suspension wires 42A, 42B, 42C, and 42D.

The frame supporting portion 40 is structured from top leaf springs 41A, 41B, 41C, and 41D and suspension wires 42A, 42B, 42C, and 42D.

Top leaf springs 41A, 41B, 41C, and 41D are each plate-shaped members that have right triangular frames. The top leaf springs 41A, 41B, 41C, and 41D are formed from metal that is elastic and electrically conductive. The top leaf springs 41A, 41B, 41C, and 41D are provided at respective supporting portions 37A, 37B, 37C, and 37D of the OIS frame portion 30.

The suspension wires 42A, 42B, 42C, and 42D are formed from metal that is elastic and electrically conductive. One end each of the suspension wires 42A, 42B, 42C, and 42D is connected to the respective top leaf spring 41A, 41B, 41C, and 41D. Moreover, the other end of each of the suspension wires 42A, 42B, 42C, and 42D is connected to the respective lead frame 25A, 25B, 25C, and 25D of the base portion 10.

Through a structure such as described above, the frame supporting portion 40 supports the OIS bearing portion 30 so as to be able to rotate.

The OIS frame portion 30 holds the lens retaining portion 60. The OIS frame portion 30 rotates in the X axial direction and the Y axial direction relative to the base portion 10. The OIS frame portion 30 is supported by the frame supporting portion 40 so as to be able to rotate.

The OIS frame portion 30 is structured from a frame 31 that is a rectangular frame, OIS magnets 32A and 32B that are provided on the frame 31, an AF magnet 35A, and an AF position detecting portion 36.

The OIS magnets 32A and 32B are provided respectively on positioning portions 33A and 33B of the frame 31. The positioning portions 33A and 33B are formed respectively along two adjacent edges of the frame 31. In the OIS frame portion 30, the OIS magnet 32A is disposed facing the OIS position detecting portion 23A and the OIS coil 22A of the base portion 10, and the OIS magnet 32B is disposed facing the OIS position detecting portion 23B and the OIS coil 22B of the base portion 10.

The AF magnet 35A is provided on the supporting portion 35B that is formed on a corner portion 38B of the frame 31. Here the corner portion of the frame 31 refers to a region in the vicinity of a corner that is between two edges that form a corner of the frame 31. The shape of the corner of the frame 31 is arbitrary. The corner of the frame 31 is not limited to being a right angle, but rather may be formed having curvature, for example. The corner portion 38B of the frame 31 is a corner portion that is made from an edge on which the OIS magnet 32A is disposed and an edge on which the OIS magnet 32B is disposed. As illustrated in FIG. 5 and FIG. 6, the AF magnet 35A faces the AF coil 62 of the lens retaining portion 60. The AF magnet 35A and the AF coil 62 structure an AF driving portion 92 for driving the lens retaining portion 60. The driving of the lens retaining portion 60 and the automatic focal point adjustment, by the AF driving portion 92, will be described below.

The AF position detecting portion 36 is provided on a supporting portion 36C that is formed on a corner portion 38D of the frame 31. The corner portion 38D of the frame 31 is opposite from the corner portion 38B wherein the AF magnet 35A is positioned (that is, it is positioned on the diagonal line). The AF position detecting portion 36 faces the AF position detecting magnet 65 of the lens retaining portion 60. The AF position detecting portion 36 faces the base portion 10, and detects the position, in the Z axial direction, of the AF position detecting magnet 65 of the lens retaining portion 60. Through this, the AF position detecting portion 36 faces the base portion 10 and is able to detect the position, in the Z axial direction, of the lens retaining portion 60. The AF position detecting portion 36 is a magnetic sensor such as, for example, a Hall element, or the like.

In the frame 31, the lens retaining portion 60 is contained within an opening portion 31A. As illustrated in FIG. 6, bearing slide portions 72A and 71A are formed respectively at mutually opposite corner portions 38A and 38C, which are other than the corner portions 38B and 38D, in the frame 31. The bearing slide portions 71A and 72A each have grooves that extend in the Z axial direction. Bearings 73A and 73B, and a bearing 73C, are disposed respectively in the bearing slide portions 71A and 72A. The bearing slide portions 71A and 72A hold the lens retaining portion 60 through the bearings 73A and 73B, and the bearing 73C. The holding of the lens retaining portion 60 will be described below.

Furthermore, supporting portions 37A, 37B, 37C, and 37D are formed a respective corner portions 38A, 38B, 38C, and 38D of the frame 31. Top leaf springs 41A, 41B, 41C, and 41D are provided on respective supporting portions 37A, 37B, 37C, and 37D.

The lens supporting portion 70 supports the lens retaining portion 60. The lens supporting portion 70 is a set of bearings 73A and 73B, and a bearing 73C. As illustrated in FIG. 3 and FIG. 6, the bearings 73A and 73B are disposed between a groove on the bearing slide portion 71A of the frame 31 and a groove of the bearing slide portion 71B of a cylindrical member 61. Moreover, the bearing 73C is provided between a bearing slide portion 72A of the frame 31 and a bearing slide portion 72B of the cylindrical member 61. Supporting of the lens retaining portion 60 will be described below.

The lens retaining portion 60 moves in the Z axial direction to adjust the focal point. The lens retaining portion 60 is contained in the opening portion 31A of the frame 31.

The lens retaining portion 60 is structured from a cylindrical member 61 that has an exterior shape that is octagonal, a yoke 63, an AF coil 62, and an AF position detecting magnet 65.

The lens barrel is contained within the cylindrical shape of the cylindrical member 61. The lens barrel is attached to an attaching portion 74 that is provided on the inner peripheral surface of the cylindrical member 61. Through this, the lens barrel is held in the cylindrical member 61. Note that the cylindrical member 61 may hold one or more lenses directly, rather than holding a lens barrel. Moreover, bearing slide portions 71B and 72B are formed on respective side face portions 67 and 68 that face the cylindrical member 61. The bearing slide portions 71B and 72B have grooves that extend in the Z axial direction.

Figure 7:
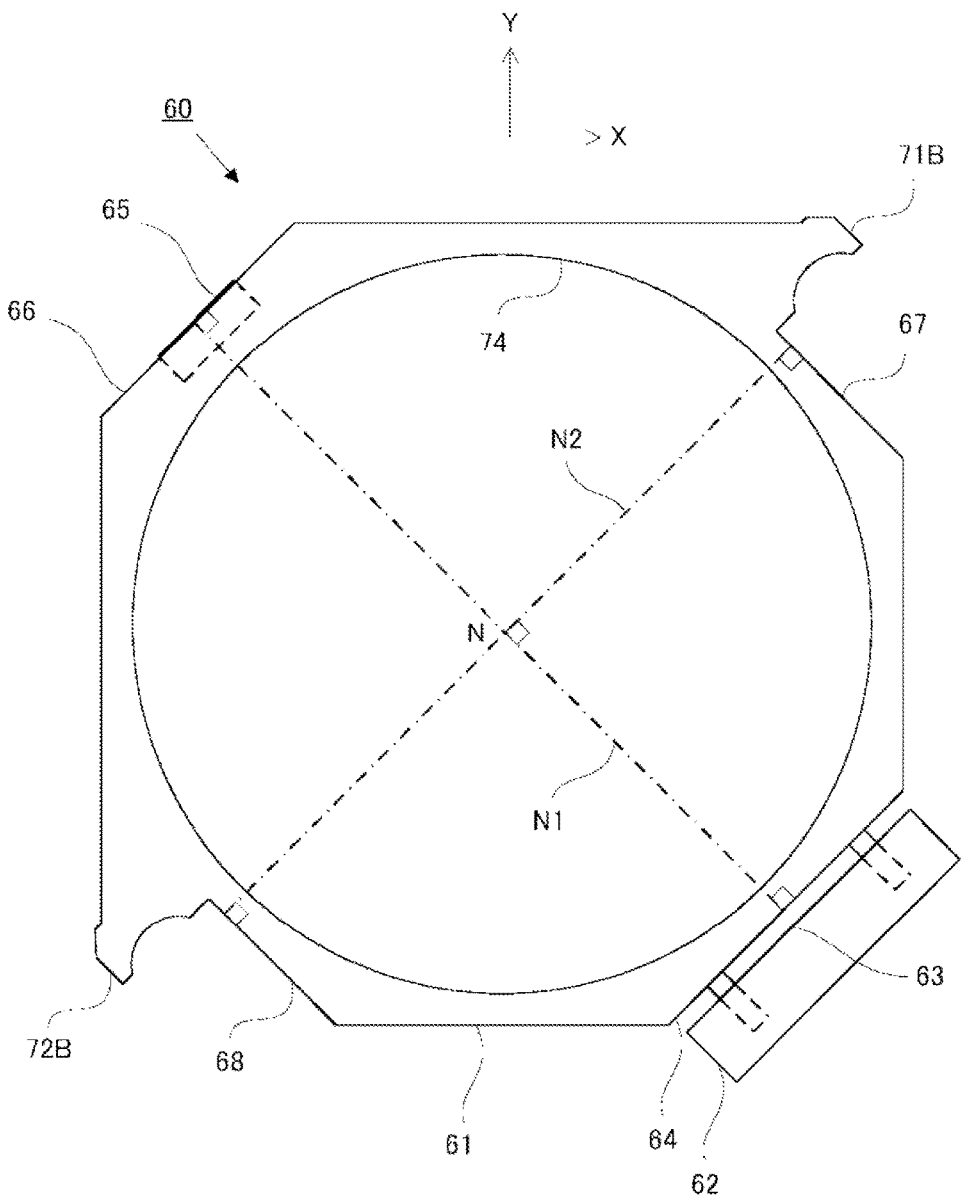
FIG. 7 is a schematic diagram depicting a lens holding portion as set forth in the example according to the present invention.

A yoke 63 is provided on a side face portion 64 of the cylindrical member 61. Moreover, the AF coil 62 is provided on the yoke 63 of the side face portion 64. The AF coil 62 faces the AF magnet 35A of the OIS frame portion 30, as illustrated in FIG. 5 and FIG. 6. The AF coil 62 and the AF magnet 35A structure the AF driving portion 92 that drives the lens retaining portion 60. The AF position detecting magnet 65 is provided on a side face portion 66 that faces the side face portion 64. The AF position detecting magnet 65, as illustrated in FIG. 5 and FIG. 6, faces the AF position detecting portion 36 of the OIS frame portion 30. Here, as illustrated in FIG. 7, the side face portion 64 and the side face portion 66, when the cylindrical member 61 is viewed in a plan view, have a positional relationship wherein the perpendicular line N1 from the side face portion 64 to the side face portion 66 is perpendicular to the perpendicular line N2 from the side face portion 67 to the side face portion 68. Consequently, the bearing slide portion 71B, the AF position detecting magnet 65, the bearing slide portion 72B, and the AF coil 62 are disposed sequentially, at 90° intervals, on the outer periphery of the cylindrical member 61, which is centered on the point of intersection N between the perpendicular line N1 and the perpendicular line N2.

The supporting and holding of the lens retaining portion 60 will be explained.

The lens retaining portion 60 is contained in the opening portion 31A of the frame 31. In this case, as illustrated in FIG. 6, the lens retaining portion 60 is arranged such that the AF coil 62 and the yoke 63 face the AF magnet 35A of the OIS frame portion 30, and the AF position detecting magnet 65 faces the AF position detecting portion 36 of the OIS frame portion 30.

Moreover, the groove of the bearing slide portion 71B of the lens retaining portion 60 faces the groove of the bearing slide portion 71A of the frame 31. The bearings 73A and 73B are held in the groove of the bearing slide portion 71B and the groove of the bearing slide portion 71A. The groove of the bearing slide portion 72B of the lens retaining portion 60 and the groove of the bearing slide portion 72A of the frame 31 also face each other. The bearing 73C is held in the groove of the bearing slide portion 72B and the groove of the bearing slide portion 72A. Given this, the lens retaining portion 60 is supported on the bearings 73A and 73B, and the bearing 73C, so as to enable movement in the Z axial direction. Moreover, the lens retaining portion 60 is held on the OIS frame portion 30 by the force of magnetic attraction of the yoke 63 and the AF magnet 35A of the OIS frame portion 30, which are disposed facing each other.

For the cover portion 80, the bottom plate is a rectangular cover. The cover portion 80 covers the OIS frame portion 30, the frame supporting portion 40, the lens retaining portion 60, and the lens supporting portion 70. The cover portion 80 is attached to the base 11 of the base portion 10. The cover portion 80 has an opening portion 82 in a bottom plate 221. The light from the imaging subject passes through the opening portion 82 to be incident into the lens barrel, to arrive at an imaging element that is disposed therebehind.

The driving and the automatic focal point adjustment of the lens retaining portion 60 will be explained next.

The mutually facing AF magnet 35A of the OIS frame portion 30, and AF coil 62 of the lens retaining portion 60 structure the AF driving portion 92. Moreover, the AF position detecting portion 36 of the OIS frame portion 30 detects the position, in the Z axial direction, of the lens retaining portion 60 relative to the base portion 10, from the magnetic field of the AF position detecting magnet 65 of the lens retaining portion 60. The AF coil 62 is disposed so that the axis of the coil is perpendicular to the magnetic field of the AF magnet 35A. Consequently, when an electric current is supplied from the controlling portion to the AF coil 62, the magnetic field that is produced in the AF coil 62 interacts with the magnetic field of the AF magnet 35A. Through this, a force in the Z axial direction acts on the AF coil 62. The cylindrical member 61 of the lens retaining portion 60 wherein the AF coil 62 is provided is supported by the bearing 73A and 73B and the bearing 73C, and thus the lens retaining portion 60 moves in the Z axial direction relative to the OIS frame portion 30. The controlling portion controls the direction of the current that flows in the AF coil 62, enabling control of the direction of movement of the lens retaining portion 60. As described above, the lens retaining portion 60 is driven by the AF driving portion 92.

The AF driving portion 92 moves the lens retaining portion 60 to the position in the Z axial direction wherein, for example, the contrast is maximized for the image that is captured. Through this, the lens driving device 100 carries out automatic focal point adjustment in the imaging device 1. In this case, the controlling portion performing feedback control of the position of the lens retaining portion 60 in the Z axial direction, based on the position of the lens retaining portion 60 in the Z axial direction, detected by the AF position detecting portion 36, enables the lens driving device 100 to control, with high precision, the position of the lens retaining portion 60 in the Z axial direction. Moreover, through this feedback control, the lens driving device 100 is able to maintain stably the position of the lens retaining portion 60 in the Z axial direction.

The driving and camera shake prevention of the OIS frame portion 30 will be explained next.

The mutually facing OIS coil 22A of the base portion 10 and OIS magnet 32A of the OIS frame portion 30 structure an OIS driving portion for driving the OIS frame portion 30 in the Y axial direction. Moreover, the mutually facing OIS coil 22B of the base portion 10 and OIS magnet 32B of the OIS frame portion 30 structure an OIS driving portion for driving the OIS frame portion 30 in the X axial direction. The OIS position detecting portions 23A and 23B of the base portion 10 face the OIS magnets 32A and 32B respectively. The OIS position detecting portion 23A detects the position of the OIS frame portion 30, in the Y axial direction, relative to the base portion 10. The OIS position detecting portion 23B detects the position of the OIS frame portion 30, in the X axial direction, relative to the base portion 10. The OIS coil 22A is disposed so that the coil axis is perpendicular to the magnetic field of the OIS magnet 32A. Consequently, when an electric current is supplied by the controlling portion to the OIS coil 22A, the magnetic field that is produced in the OIS coil 22A interacts with the magnetic field of the OIS magnet 32A. Through this, a force acts on the OIS magnet 32A in the Y axial direction. The OIS frame portion 30 is supported, by the frame supporting portion 40, so as to be able to rotate, and thus the OIS frame portion 30 moves in the Y axial direction relative to the base portion 10. The controlling portion is able to control the direction of movement of the OIS frame portion 30 through controlling the direction in which the electric current flows in the OIS coil 22A.

Moreover, the OIS coil 22B of the base portion 10 is disposed so that the coil axis is perpendicular to the magnetic field of the OIS magnet 32B. Consequently, when an electric current is supplied by the controlling portion to the OIS coil 22B, the magnetic field that is produced in the OIS coil 22B interacts with the magnetic field of the OIS magnet 32B. Through this, a force acts on the OIS magnet 32B in the X axial direction. The OIS frame portion 30 is supported, by the frame supporting portion 40, so as to be able to rotate, and thus the OIS frame portion 30 moves in the X axial direction relative to the base portion 10. The controlling portion is able to control the direction of movement of the OIS frame portion 30 through controlling the direction in which the electric current flows in the OIS coil 22B. The OIS frame portion 30 is driven by the OIS driving portion as described above.

The OIS driving portion moves the OIS frame portion 30 so as to cancel out vibration that is detected by a vibration sensor of the imaging device 1. Through this, the lens driving device 100 is able to prevent camera shaking in the imaging device 1. The lens driving device 100 is able to prevent camera shaking, with high accuracy, through the controlling portion performing feedback control of the position of the OIS frame portion 30, based on the position of the OIS frame portion 30 that is detected by the OIS position detecting portions 23A and 23B.

The top leaf springs 41A, 41B, 41C, and 41D in the first embodiment will be explained in the present embodiment. In the lens driving device 100, the top leaf springs 41A, 41B, 41C, and 41D are provided respectively at the corner portions 38A, 38B, 38C, and 38D of the frame 31. Moreover, the top leaf springs 41A, 41B, 41C, and 41D are joined respectively to suspension wires 42A, 42B, 42C, and 42D through soldering.

First, the corner portions 38A, 38B, 38C, and 38D of the frame 31 will be explained using, as an example, the corner portion 38B wherein the top leaf spring 41B is provided. The structures of the corner portions 38A, 38C, and 38D are the same as for that of the corner portion 38B, in regards to attaching the top leaf springs 41A, 41C, and 41D.

Figure 8:
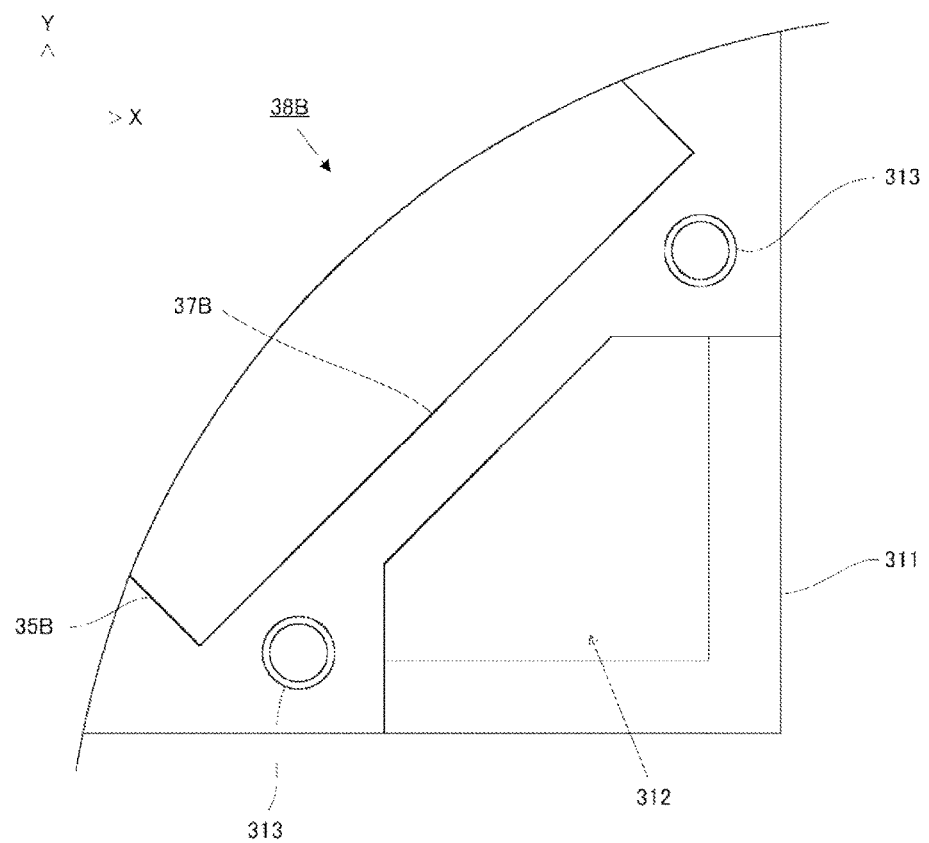
FIG. 8 is a partial enlarged diagram depicting a corner portion of a frame according to another example according to the present invention.

As illustrated in FIGS. 3 and 8, in the corner portion 38B, the top face of an L-shaped sidewall 311 of the frame 31 is formed so as to be lower, in the Z axial direction, than the supporting portion 37B that is provided with the top leaf spring 41B. Moreover, an opening portion 312 that is surrounded by the sidewall 311 of the frame 31 and the supporting portion 37B is formed in the corner portion 38B. Two circular columnar protruding portions 313 are formed in the supporting portion 37B. The protruding portion 313 protrudes in the Z axial direction.

The structures of the top leaf springs 41A, 41B, 41C, and 41D will be explained next in reference to FIG. 9. The top leaf springs 41A, 41B, 41C, and 41D are plate-shaped members that have identical shapes and sizes. The top leaf spring 41B will be explained below.

Figure 9:
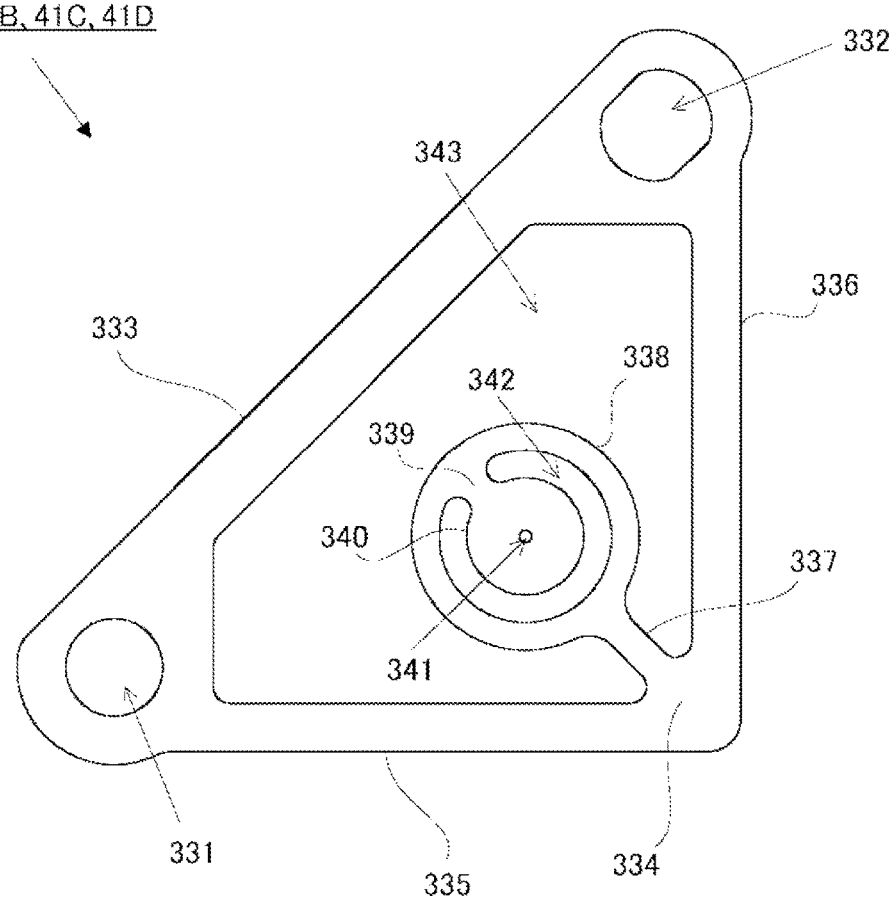
FIG. 9 is a plan view diagram of a top leaf spring according to the other example according to the present invention.

As illustrated in FIG. 9, the top leaf spring 41B has a frame that is formed in a right triangle from a diagonal edge portion 333 and edge portions 335 and 336. The edge portion 335 and the edge portion 336 are joined at right angles at an apex portion 334. A circular through hole 331 is formed at the joining portion of the diagonal edge portion 333 and the edge portion 335. An elliptical through hole 332, that extends in parallel to the lengthwise direction of the diagonal edge portion 333, is formed at the joining portion of the diagonal edge portion 333 and the edge portion 336. Note that the widths of the edge portion 335 and the edge portion 336 are identical.

An opening portion 343 with an irregular pentagonal shape is formed on the inside of the frame. In the opening portion 343, an arm portion 337 extends out, from the apex portion 334, in the direction toward the diagonal edge portion 333. An outer peripheral portion 338, a connecting portion 339, a joining portion 340, a through hole 341, and a slit 342 are formed at the end portion of the arm portion 337 on the diagonal edge portion 333 side.

The outer peripheral portion 338 is formed in a circular ring shape. The outer peripheral portion 338 is joined to an end portion of the arm portion 337, on the diagonal edge portion 333 side, on the outer periphery of the ring. Moreover, the outer peripheral portion 338 is surrounded by the connecting portion 339 and the joining portion 340.

The connecting portion 339 protrudes in a strip-shaped from the outer edge of the joining portion 340. Moreover, one end of the connecting portion 339 is joined to the inner periphery of the outer peripheral portion 338. That is, the connecting portion 339 joins the outer peripheral portion 338 and the joining portion 340.

The joining portion 340 is formed in a circle. The joining portion 340 is joined to the outer peripheral portion 338 through the connecting portion 339. The outer peripheral portion 338 is joined to the arm portion 337, and so the joining portion 340 is joined to the arm portion 337 through the connecting portion 339 and the outer peripheral portion 338. Moreover, a through hole 341, into which the suspension wire 42B is inserted, is formed in the center portion of the joining portion 340.

A C-shaped slit 342 is formed between the outer peripheral portion 338 and the joining portion 340. In the present embodiment, the slit 342 is formed so as to be concentric with the outer peripheral portion 338 and the joining portion 340. Moreover, the connecting portion 339 has a length that is equal to the width of the slit 342. The arm portion 337, the outer peripheral portion 338, and the connecting portion 339 each have their respective prescribed widths. The prescribed widths of the arm portion 337, the outer peripheral portion 338, and the connecting portion 339 are narrower than the widths of the edge portions 335 and 336.

The shape and dimensions of the top leaf spring 41B are determined so that the arm portion 337 will determine the elasticity of the top leaf spring 41B. For example, the outer peripheral portion 338 and the connecting portion 339 each have moduli of elasticity that are near to being rigid bodies. In particular, the connecting portion 339 is formed in a shape that has a modulus of elasticity that is adequately larger than the modulus of elasticity of the arm portion 337. Through these, the elasticity of the top leaf spring 41B is determined by the arm portion 337. Note that preferably the arm portion 337, the outer peripheral portion 338, the connecting portion 339, and the joining portion 340 are positioned within a single plane. Moreover, in order to avoid concentration of stresses, the inner corner portions and the outer corner portions of the top leaf spring 41B may be formed rounded.

The attachment of the top leaf spring 41B to the corner portion 38B and the joining of the top leaf spring 41B and the suspension wire 42B will be explained in reference to FIG. 10 through FIG. 12.

Figure 10:
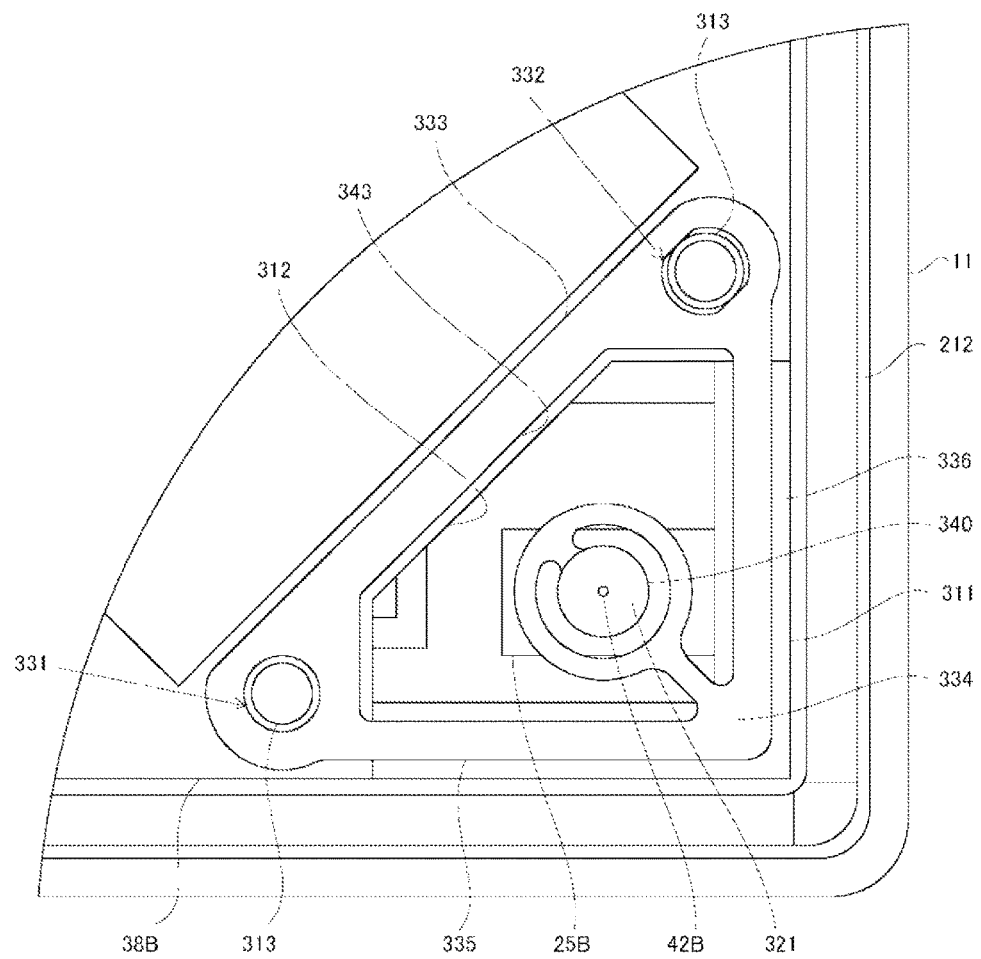
FIG. 10 is a partial enlarged diagram depicting a top leaf spring and a suspension wire according to the second embodiment according to the present invention.

As depicted in FIG. 10, in a state wherein two protruding portions 313 of the corner portion 38B are inserted into respective through holes 331 and 332 of the top leaf spring 41B, the top leaf spring 41B is provided at a prescribed position of the supporting portion 37B. The top leaf spring 41B is secured to the supporting portion 37B by an adhesive agent.

In this case, the edge portions 335 and 336 of the top leaf spring 41B each rise away from the frame 31 at positions corresponding to the edges of the sidewall 311. Moreover, the opening portion 343 of the top leaf spring 41B is positioned at a position corresponding to the opening portion 312 of the frame 31. Consequently, in the top leaf spring 41B that is provided on the frame 31, the diagonal edge portion 333 functions as a leaf spring that is connected to the supporting portion 37B of the frame 31.

In the suspension wire 42B, one end portion is soldered to the top leaf spring 41B through solder 321 in a state wherein it is inserted into the through hole 341 of the top leaf spring 41B. Through this, the suspension wire 42B and the top leaf spring 41B are joined. The solder 321 is provided on the circular surface that is positioned on the front side of the joining portion 340. Consequently, the top leaf spring 41B is a leaf spring that is provided with a joining material (solder 321) for joining that which is to be joined (the suspension wire 42B) to the surface of the joining portion 340. Note that the other end portion of the suspension wire 42B is soldered to the lead frame 25B of the base portion 10.

The solder 321 is formed through heating, using a soldering iron, an oven, or the like, a wire solder, a cream solder, or the like. The solder 321 preferably is a solder that includes a flux 361. Moreover, the solder 321 may be a solder that uses a flux in soldering.

Figure 11:
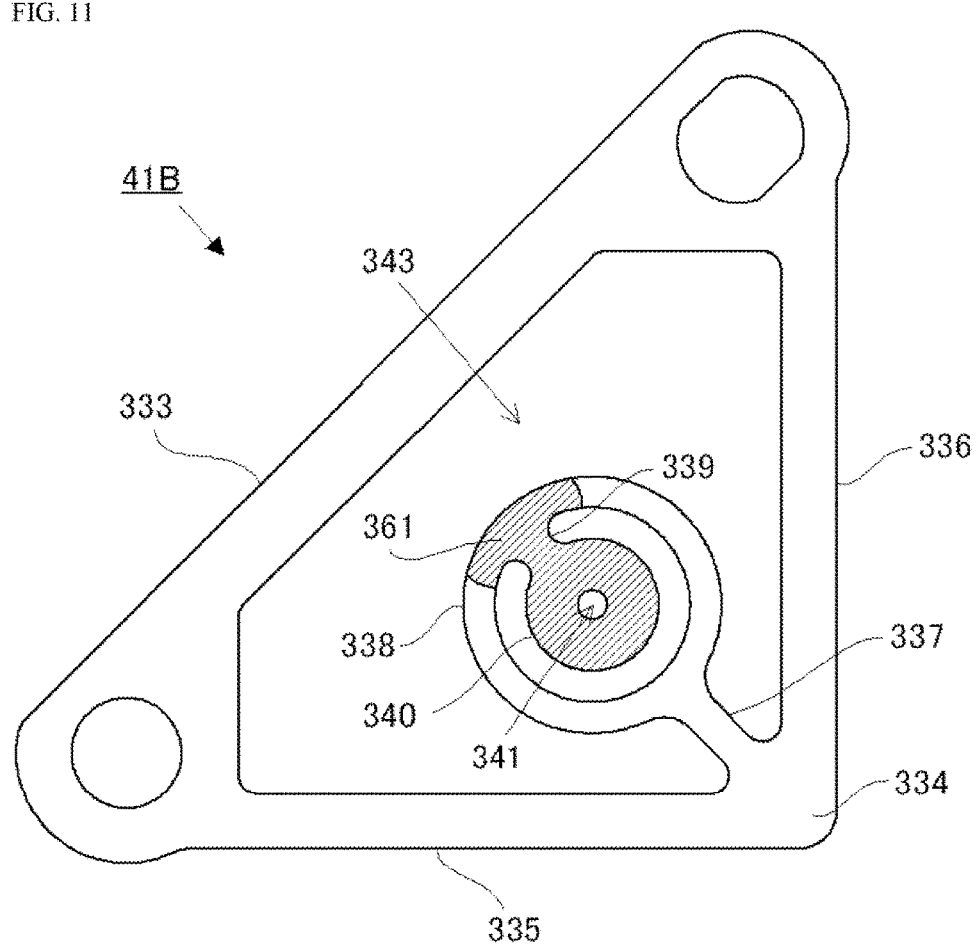
FIG. 11 is a schematic diagram for explaining the spread of flux in the other example according to the present invention.

As depicted in FIG. 11, the joining portion 340 that is provided with the solder 321 is joined to the arm portion 337 through the connecting portion 339 and the outer peripheral portion 338, and thus, in soldering, the flux 361 that is included in the solder 321 is prevented from spreading to the arm portion 337. This prevents the modulus of elasticity of the arm portion 337, which controls the elasticity of the top leaf spring 41B, from being changed by the flux 361. Note that, as illustrated in FIG. 11, preferably the position wherein the connecting portion 339 joins to the outer peripheral portion 338 is the furthest position from the position of the junction of the arm portion 337 to the outer peripheral portion 338, so as to cause the region over which the flux 361 spreads to be wider.

Here, as a reference example, the spread of the flux 361 in a leaf spring 350 that has no outer peripheral portion 338 or connecting portion 339, will be explained. Note that for ease in understanding, the structure of the leaf spring 350 is the same as the structure of the top leaf spring 41B, except for the structures that are explained using reference symbols that are different from those of the top leaf spring 41B.

Figure 12:
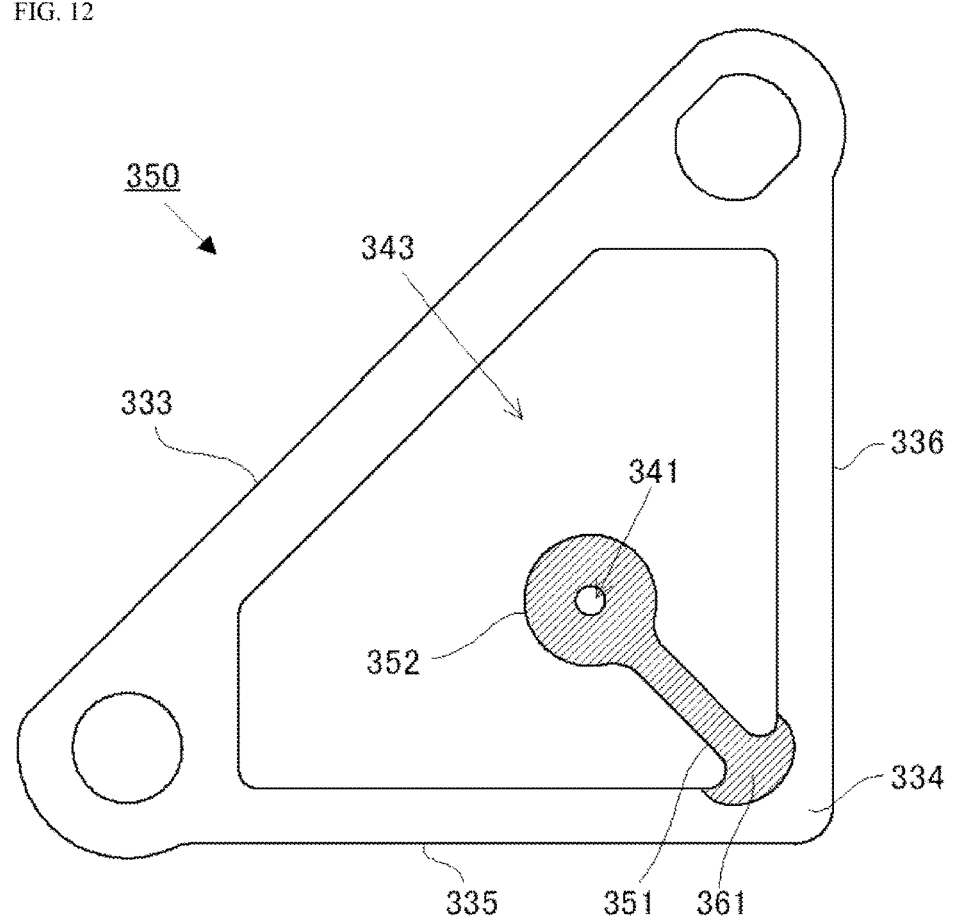
FIG. 12 is a schematic diagram for explaining the spread of flux according to a reference example.

As illustrated in FIG. 12, in the leaf spring 350, the arm portion 351 that corresponds to the arm portion 337 of the top leaf spring 41B extends in the direction facing the diagonal edge portion 333 from the apex portion 334. A circular joining portion 352 having a through hole in the center portion thereof is formed on the tip end of the arm portion 351. Note that in FIG. 11 and FIG. 12, the solder 321 is omitted, for ease in understanding.

When the suspension wire 42B and the joining portion 352 of the leaf spring 350 have been soldered together, the joining portion 352 and the arm portion 351 are joined directly, and thus the flux 361 easily spreads from the joining portion 352, which has a wide area, to the arm portion 351, which has a narrow width. Moreover, the flux 361 spreads in the arm portion 351, which tends to produce variability depending on the condition of the soldering.

In the reference example, the flux 361 spreads to the arm portion 351, changing the modulus of elasticity of the arm portion 351. Moreover, due to variability in the spread of the flux 361, there is variability in the modulus of elasticity of the arm portions 351. Consequently, it is difficult to prevent camera shaking with high accuracy in the shake correcting mechanism provided with the leaf spring 350.

As described above, in the top leaf spring 41B, the joining portion 340 is joined to the arm portion 337 through the connecting portion 339 and the outer peripheral portion 338, and thus preventing, in the soldering, the spreading of the flux 361 to the arm portion 337. Through this, a top leaf spring 41B is achieved that prevents the change in the modulus of elasticity of the arm portion 337, thereby preventing, with high accuracy, camera shaking in the lens driving device 100. Note that the top leaf spring 41B prevents spreading of the solder 321 to the arm portion 337 in the same manner as for the flux 361.

Moreover, the top leaf spring 41B prevents the spread of the flux 361 and the solder 321 to the arm portion 337, without requiring a three-dimensional structure. Furthermore, the top leaf spring 41B can be manufactured from a single plate-shaped member. As a result, the top leaf spring 41B is manufactured easily and at a low cost.

In the present invention, the joining material for joining the top leaf spring 41B and the suspension wire 42B is not limited to being solder 321. For example, instead of the solder 321, the top leaf spring 41B and the suspension wire 42B may be joined through a conductive adhesive agent such as a silver paste, or the like, provided at the joining portion 340. The top leaf spring 41B prevents the conductive adhesive agent or the solvent for the conductive adhesive agent from spreading to the arm portion 337, in the same manner as for the flux 361.

Moreover, if no electric power is, or the like, is to be supplied through the suspension wire 42B, the top leaf spring 41B and the suspension wire 42B may be joined through a thermally curable adhesive agent or optically curable adhesive agent, provided in the joining portion 340.

In the present example, the joining portion 340 is a circle, but it may instead be an ellipse, a polygon, or the like. Moreover, the outer peripheral portion 338 is not limited to being a circular ring, but it need only be annular.

The shapes and dimensions of the various portions of the top leaf spring 41B may be varied. The top leaf spring 41B may have a plurality of connecting portions 339 and arm portions 337.

Some or all of the portions in the next examplet may be described also as in the addenda below:

A leaf spring comprising a joining portion provided with a joining material for joining that which is to be joined; a connecting portion that protrudes from an outer edge of the joining portion; an outer peripheral portion for surrounding the joining portion and the connecting portion, for joining one end of the connecting portion; and an arm portion, with one in joined to the outer peripheral portion, having a prescribed modulus of elasticity.

A leaf spring as set forth above, wherein a position wherein the connecting portion is joined to the outer peripheral portion, in the circumferential direction of the outer peripheral portion, is the position wherein the arm portion is furthest from the position of the joining to the outer peripheral portion.

A leaf spring as set forth in either example above, wherein the modulus of elasticity of the connecting portion is greater than the prescribed modulus of elasticity of the arm portion.

A leaf spring as set forth in any example above: having, in the joining portion, a through hole into which is inserted that which is to be joined.

A lens driving device comprising: a leaf spring as set forth in any example above; a suspension wire that is joined to the joining portion of the leaf spring; a lens retaining portion for holding the lens and that is supported by the leaf spring and the suspension wire; and a driving portion for driving the lens retaining portion in a direction that is perpendicular to the optical axial direction of the lens.

A lens driving device as set forth in the example above, including a frame for enclosing the lens retaining portion, wherein: the lens retaining portion is supported by the leaf spring and the suspension wire through the frame.

An imaging device comprising the lens driving device set forth in the examples above.

An electronic device comprising the lens driving device set forth in the examples above.

In the present example, the lead frames 25A, 25B, 25C, and 25D, and the top leaf springs 41A, 41B, 41C, and 41D will be explained using the lead frame 25B and the top leaf spring 41B as examples, referencing FIG. 13 through FIG. 19. Moreover, the joining of the lead frames 25A, 25B, 25C, and 25D, the suspension wires 42A, 42B, 42C, and 42D, and the top leaf springs 41A, 41B, 41C, and 41D will be explained.

Figure 13:
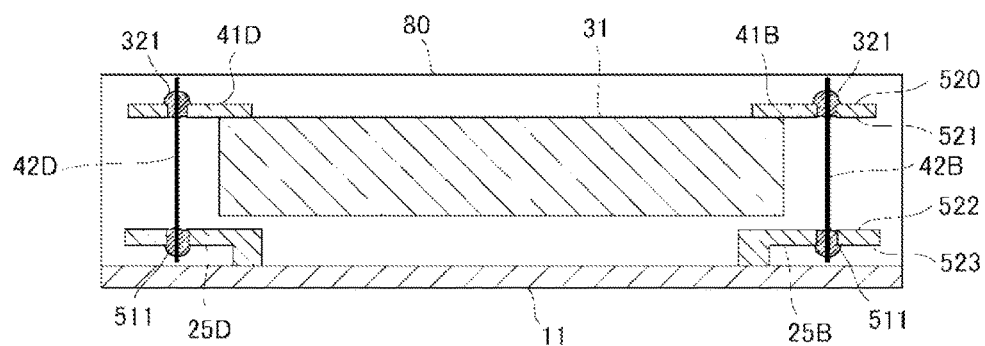
FIG. 13 is a schematic diagram depicting schematically a lead frame, the suspension wire, and a top leaf spring in a cross-section, viewed along the section A-A, of the lens driving device depicted in FIG. 4.

In the lens driving device 100, the lead frame 25B and the suspension wire 42B, as illustrated in FIG. 13, are joined through soldering. Moreover, the top leaf spring 41B and the suspension wire 42B are also joined through soldering. Furthermore, the top leaf spring 41B and the lead frame 25B oppose each other, with the suspension wire 42B held therebetween. The lead frame 25B supports the top leaf spring 41B and the suspension wire 42B.

Figure 14:
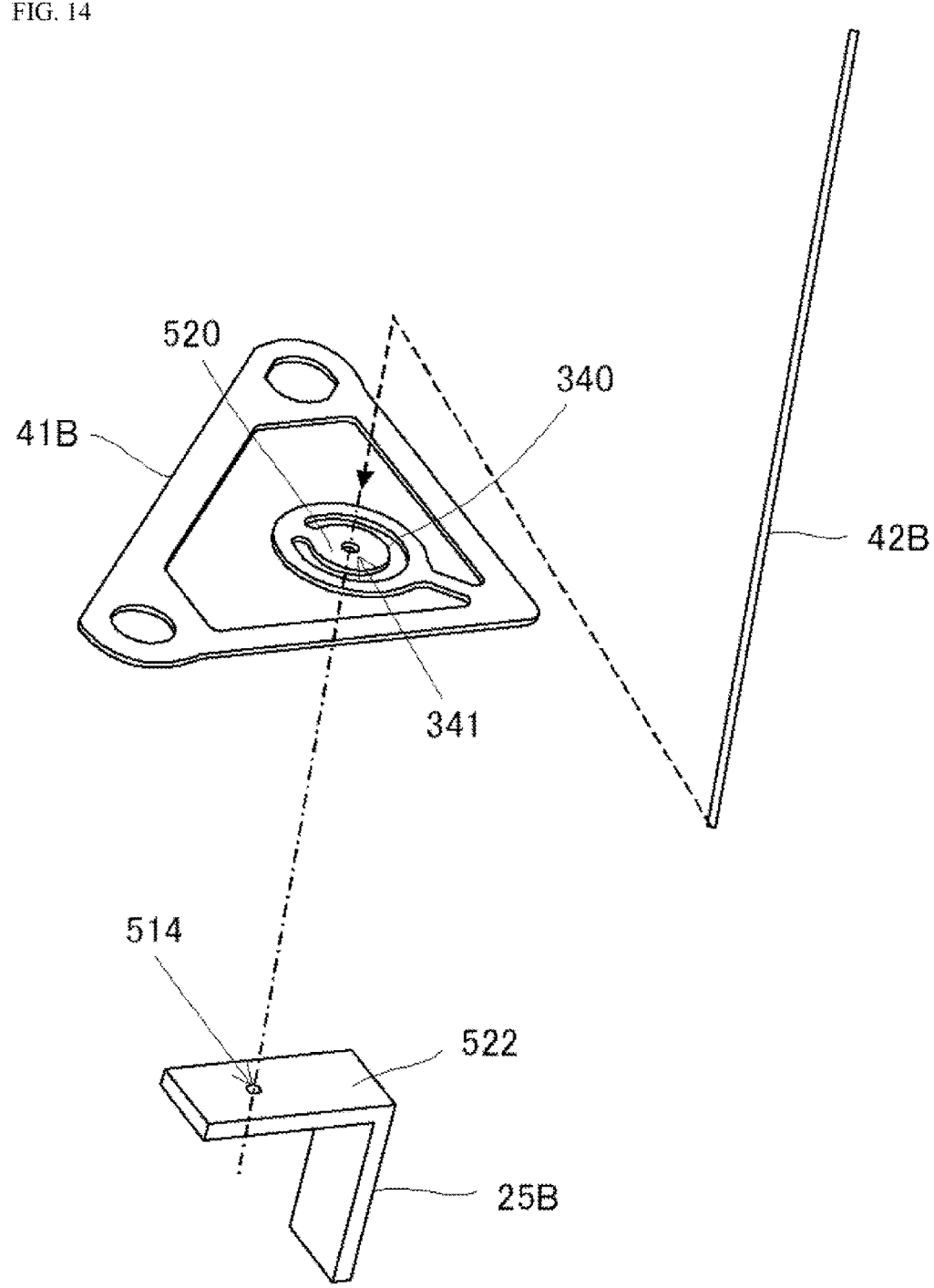
FIG. 14 is a perspective diagram depicting a lead frame, a suspension wire, and a top leaf spring according to a further example according to the present invention.
Figure 15:
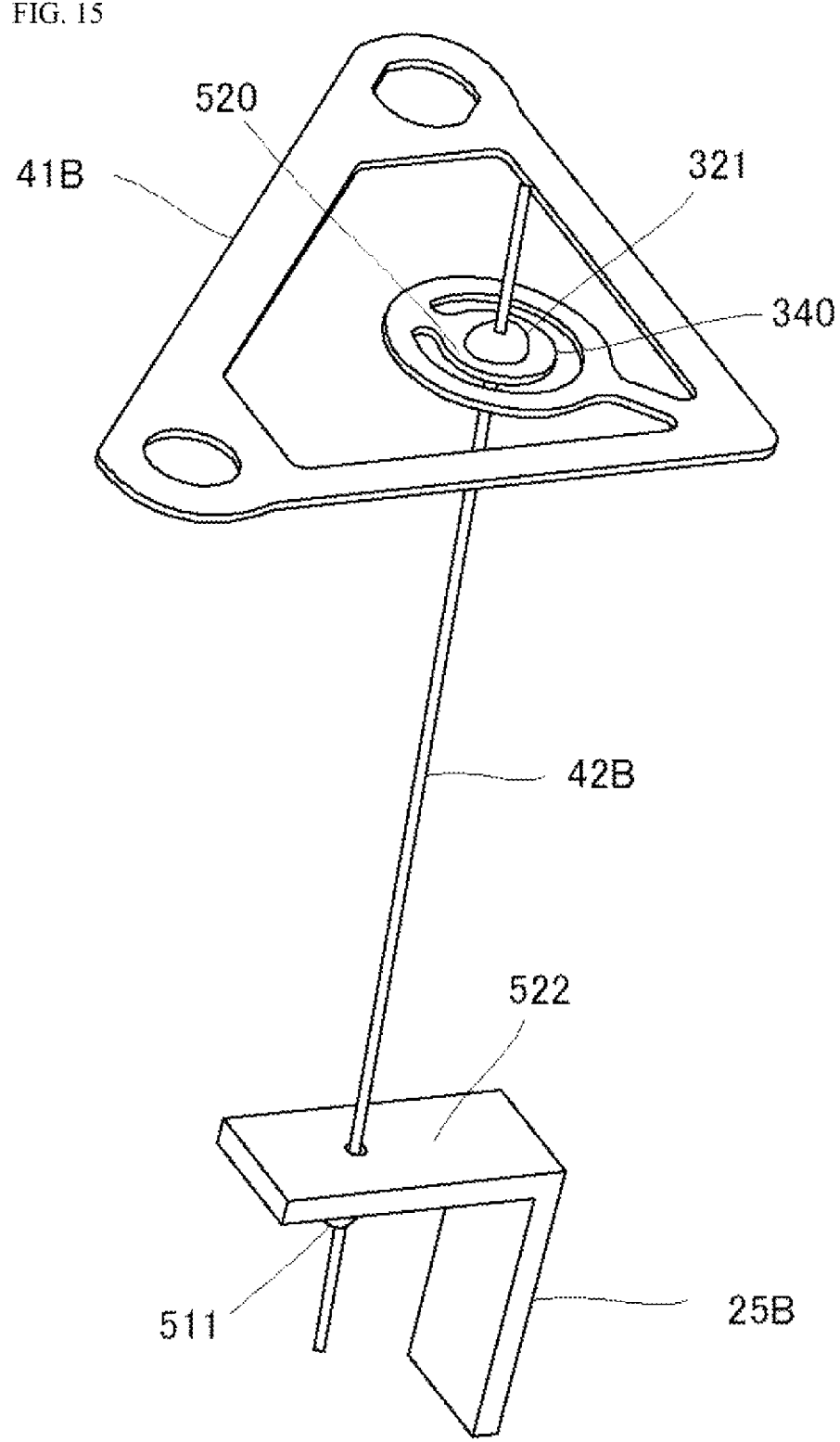
FIG. 15 is a perspective diagram depicting a lead frame, a suspension wire, and a top leaf spring, joined through solder, according to a further example according to the present invention.
Figure 16:
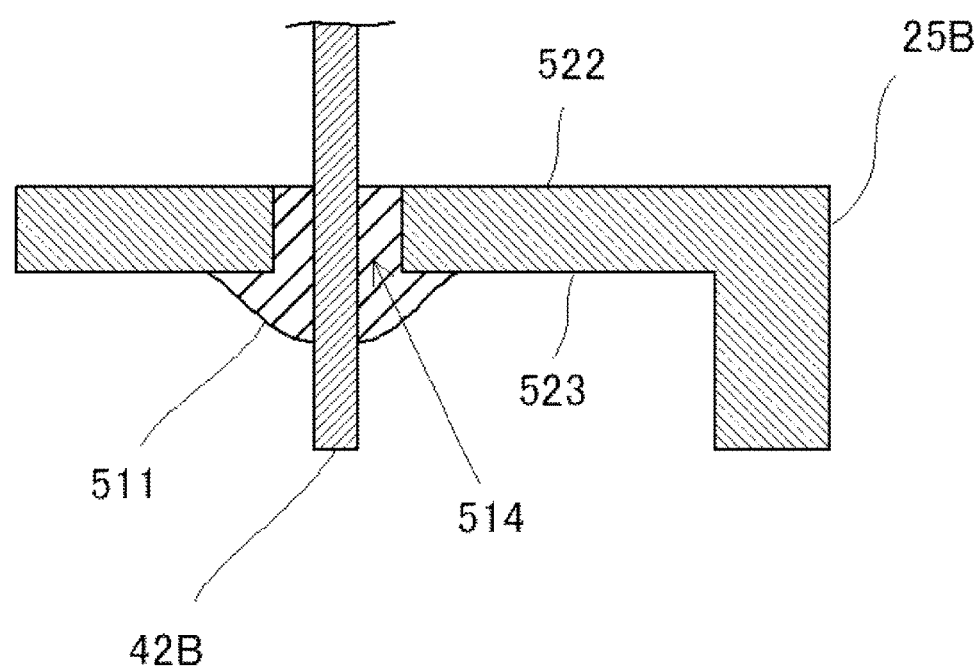
FIG. 16 is a schematic diagram depicting joining of a lead frame and a suspension wire according to the further example according to the present invention.

The lead frame 25B is formed from copper alloy, and the surface thereof is plated. The surface of the face 522 of the lead frame 25B that faces the top leaf spring 41B is plated with nickel. Moreover, the surface of the face 523, which is opposite from the face 522, is plated with gold. Consequently, the solder wettability of the face 523 is higher than the solder wettability of the face 522. The lead frame 25B has a through hole 514, as depicted in FIG. 14. The lead frame 25B is soldered to the suspension wire 42B, through solder 511, in a state wherein one end of the suspension wire 42B is inserted into a through hole 514. In soldering, the solder 511 is provided on the face 523, as illustrated in FIGS. 15 and 16.

Figure 18:
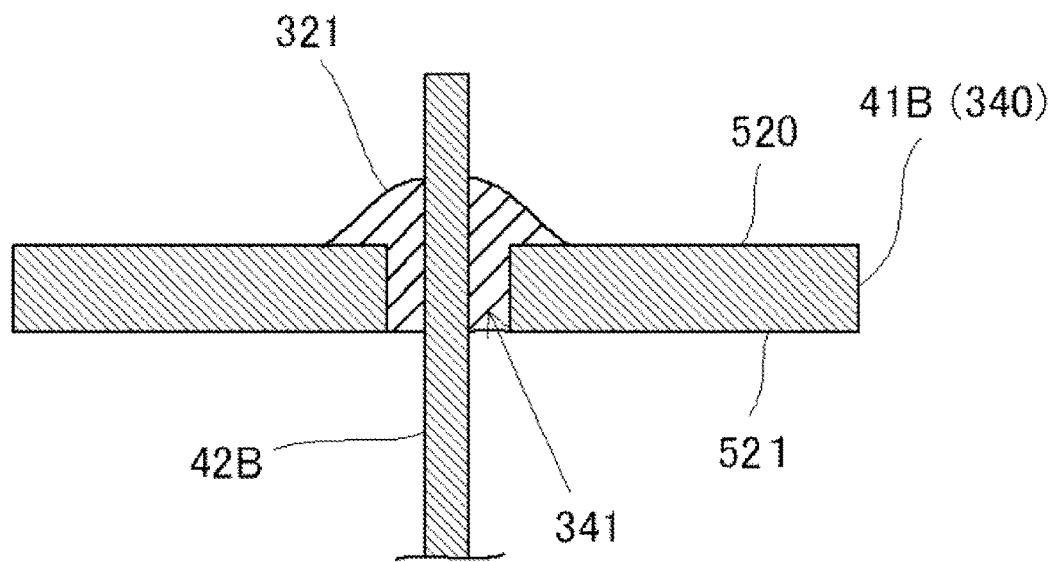
FIG. 18 is a schematic diagram depicting joining of a top leaf spring and a suspension wire according to a further example according to the present invention.
Figure 19:
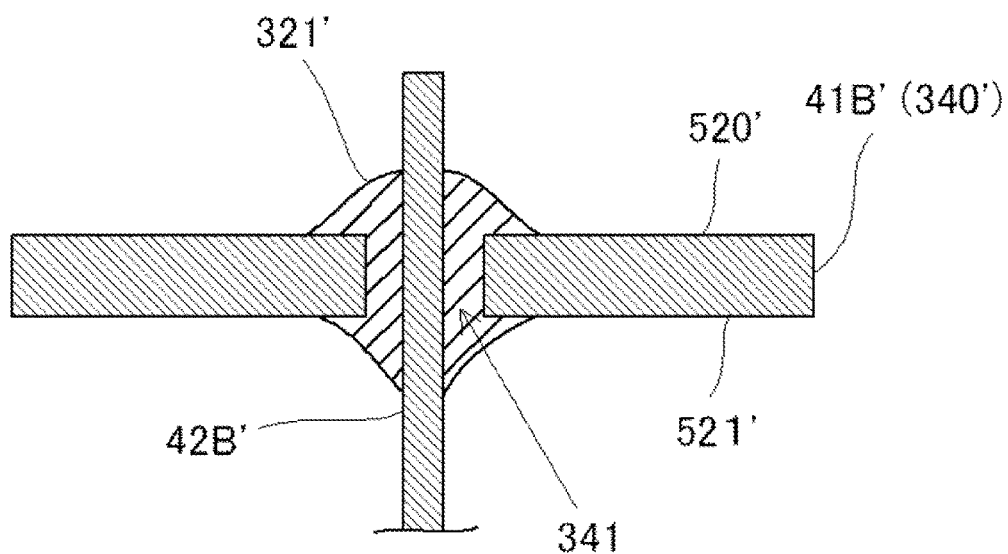
FIG. 19 is a schematic diagram illustrating the joining between the top leaf spring and a suspension wire in a reference example.

The top leaf spring 41B is formed from copper alloy, and the surface thereof is plated. The surface of the face 521 that faces the lead frame 25B of the top leaf spring 41B is plated with nickel. Moreover, the surface of the face 521, which is opposite from the face 520, is plated with gold. Consequently, the solder wettability of the face 520 is higher than the solder wettability of the face 521. The top leaf spring 41B, as depicted in FIG. 14, has a through hole 341 in the joining portion 340. The top leaf spring 41B is soldered to the suspension wire 42B, through solder 321, in a state wherein the other end of the suspension wire 42B is inserted into a through hole 341. In soldering, the solder 321 is provided on the face 520 in the joining portion 340, as illustrated in FIGS. 15 and 18.

The suspension wire 42B is formed from metal that is elastic and electrically conductive.

In the present embodiment, the solder wettability of the face 523 of the lead frame 25B is higher than the solder wettability of the face 522 of the lead frame 25B, making it possible to suppress the spread of the solder 511, provided on the face 523, through the through hole 514, to the face 522 that faces the top leaf spring 41B. Consequently, the length of the part of the suspension wire 42B that undergoes elastic deformation between the lead frame 25B and the top leaf spring 41B is constant. As a result, the lens driving device 100 can prevent camera shake with high accuracy.

Figure 17:
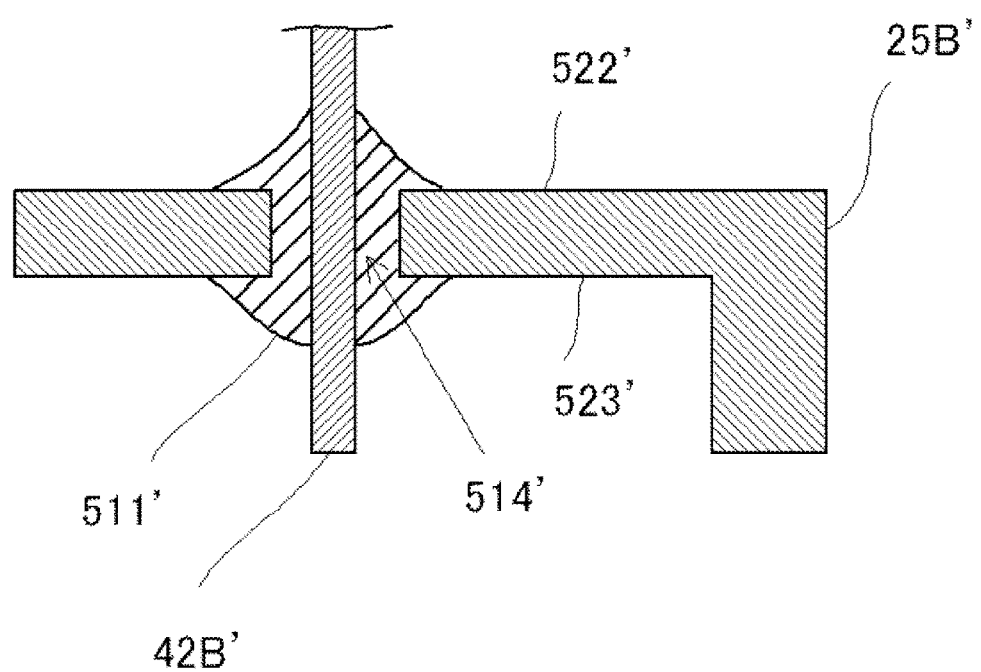
FIG. 17 is a schematic diagram illustrating the joining between the lead frame and a suspension wire in a reference example.

For example, as in the reference example illustrated in FIG. 17, in a lead frame 25B' having a face 522 that faces the top leaf spring 41B and a face 523' on the opposite side from the face 522', that both have the same solder wettability, the solder 511' that is provided on the face 523' will spread through the through hole 514' to the face 522'. The solder 511 that has spread to the face 522' bulges out along the suspension wire 42B', thus changing the length of the part of the suspension wire 42B' that undergoes elastic deformation. Moreover, the spread of the solder 511' on the face 522' tends to have variability depending on the soldering conditions, and thus the length of the part that undergoes elastic deformation will be different from suspension wire to suspension wire. Consequently, in a lens driving device that comprises a lead frame 25B', it is difficult to prevent camera shake with high accuracy.

In the top leaf spring 41B as well, the solder wettability of the face 520 is higher than the solder wettability of the face 521, making it possible to suppress the spread of the solder 321, provided on the face 520, through the through hole 341, to the face 521 that faces the lead frame 25B. Consequently, the lengths of the parts of the suspension wires 42B that undergo elastic deformation are caused to be uniform. As a result, the lens driving device 100 can prevent camera shake with high accuracy. For example, as in the reference example illustrated in FIG. 19, in top leaf spring 41B' (joining portion 340') having a face 521' that faces the lead frame 25B and a face 520' on the opposite side from the face 521', that both have the same solder wettability, the solder 321' that is provided on the face 520' will spread to the face 521'. Consequently, as with lens driving device equipped with the lead frame 25B' in the reference example, in the lens driving device comprising the top leaf spring 41B', it is difficult to prevent shaking with high accuracy.

The forms of the faces 522 and 523 of the lead frame 25B, and the solder wettability, will be explained next. The surface of the lead frame 25B is plated with nickel and plated with gold sequentially. The gold plating layer of the face 522 is removed through exposure of a laser beam onto the gold plating layer that is formed on the face 522. Through this, a nickel plating layer is formed on the surface of the face 522, and a gold plating layer is formed on the surface of the face 523 of the lead frame 25B. Note that the plating processes for the lead frame 25B may be performed separately for the face 522 and the face 523.

The solder wettability of the face 522 and the face 523 of the lead frame 25B may be measured through, for example, a method that tests a wetting width. The wetting width test method is standardized by in IEC (International Electric Standardization Committee), in JIS (JIS Z 3198-3), and in EIAJ (Electronic Industries Association of Japan). Note that the solder wettability may instead be measured through the menisograph test method, the globule method, the one- and dip method, the rotary dip method, or the like. The meniscograph test method is standardized by the IEC, JIS, and EIAJ.

In the top leaf spring 41B, as with the lead frame 25B, a gold plating layer is formed on the face 520 and a nickel plating layer is formed on the face 521. Moreover, the solder wettability of the face 520 and the face 521 of the top leaf spring 41B, may be measured through the wetting width test method, or the like, in the same manner as for the face 522 and the face 523 of the lead frame 25B.

As described above, in the lead frame 25B, the solder wettability of the face 523 on the side that is opposite from the face 522 is higher than the solder wettability of the face 522 that faces the top leaf spring 41B, thus making possible to prevent the solder 511 that is provided on the face 523 from spreading to the face 522. Through this, the length of the part of the suspension wire 42B that undergoes elastic deformation between the lead frame 25B and the top leaf spring 41B is made constant. As a result, the lengths of the parts of the suspension wires 42A, 42B, 42C, and 42D that undergoes elastic deformation will be uniform, making it possible to prevent, with high accuracy, camera shaking of the lens driving device 100.

Moreover, in top leaf spring 41B as well, the solder wettability of the face 520 on the side that is opposite from the face 521 is higher than the solder wettability of the face 521 that faces the lead frame 25B, thus making possible to prevent the solder 321 that is provided on the face 520 from spreading to the face 521. Through this, in the top leaf spring 41B as well, the length of the part of the suspension wire 42B that undergoes elastic deformation is made constant, in the same way as with the lead frame 25B. As a result, the lengths of the parts of the suspension wires 42A, 42B, 42C, and 42D that undergoes elastic deformation will be uniform, making it possible to prevent, with high accuracy, camera shaking of the lens driving device 100. Note that in the lead frame 25B and/or top leaf spring 41B, the solder wettability of the face on the opposite side of the face that faces the other should be higher than the solder wettability of the face that faces the other.

In the present embodiment, the explanation was for a lead frame 25B, but 25A, 25C, and 25D have surfaces that are the same as those of the lead frame 25B. Moreover, the top leaf springs 41A, 41C, and 41D have surfaces that are the same as the surfaces of the top leaf spring 41B.

In the present embodiment, the surfaces of the faces 520 and 523 that have high solder wettability are gold plating layers, but instead the surfaces of the faces 520 and 523 may have gold, silver, tin, solder, or the like, which have high solder wettability, as the main component. Moreover, while the surfaces of the face 521 and face 522 that have low solder wettability were nickel plated layers, the surfaces of the face 521 and face 522 may instead be layers that have nickel, zinc, or the like, which have low solder wettability, as the main component.

Moreover, the solder wettability of the faces 520, 521, 522, 523 may be modified through an oxidizing process, a surface roughening process, or the like, or rather than through plating.

The joining material for joining the lead frame 25B, the suspension wire 42B, and the top leaf spring 41B is not limited to only solder. For example, the top leaf spring 41B and the suspension wire 42B may be joined through a conductive adhesive agent such as a silver paste, or the like. Moreover, if no electric power is, or the like, is to be supplied through the suspension wire 42B, the top leaf spring 41B and the suspension wire 42B may be joined through a thermally curable adhesive agent or optically curable adhesive agent. In this case, the wettability of the faces 520 and 523 in respect to the joining material is higher than the wettability of the faces 521 and 522 in respect to the joining material.

Although an embodiment according to the present invention has been explained above, the present invention is not limited to this embodiment, but rather may be varied in a variety of ways within a range that does not deviate from the spirit or intent of the present invention. The present application is based on Japanese Patent Application 2015-119836, and Japanese Patent Application 2015-119837, which were filed on Jun. 12, 2015. The present application incorporates by reference the Specifications and Patent Claims of Japanese Patent Application 2015-119836, and Japanese Patent Application 2015-119837.

The invention claimed is:

1. A lens driving device comprising:
a leaf spring;
a suspension wire, wherein one end portion is joined to the leaf spring;
a supporting plate to which the other end portion of the suspension wire is joined;
a lens retaining portion for holding the lens, supported by the leaf spring and the suspension wire; and
a driver driving the lens retaining portion in a direction that is perpendicular to the optical axial direction of the lens,
wherein at least one of the leaf spring and the supporting plate is joined to the suspension wire through a joining material that is provided on a primary face; and
wherein the wettability of the primary face in respect to the joining material is higher than the wettability, in respect to the joining material, of the face that is on the opposite side from the primary face.

2. The lens driving device as set forth in claim 1, wherein:
at least one of the leaf spring and the supporting plate has a through hole;
the suspension wire is inserted into the through hole; and
the primary face, on which the joining material is provided, is the face on the opposite side of the faces wherein the leaf spring and the supporting plate face each other.

3. The lens driving device as set forth in claim 1, wherein:
the joining material is solder.

4. The lens driving device as set forth in claim 1, further comprising:

a frame enclosing the lens retaining portion, wherein the lens retaining portion is supported by the leaf spring and the suspension wire through the frame.

5. The lens driving device as set forth in claim 1, wherein: the surface of the primary face of the joining material has, as a main component, gold, silver, tin, or copper; and the surface of the face on the side that is opposite from the primary face has, as a main component, nickel or zinc.

6. The lens driving device as set forth in claim 1, wherein: at least one of the supporting plate and/or the leaf spring has at least one layer that is gold plating, silver plating, tin plating, solder plating, copper plating, zinc plating, and nickel plating.

7. The lens driving device as set forth in claim 1, wherein: the leaf spring, the suspension wire, and the supporting plate are electrically conductive.

8. The lens driving device as set forth in claim 1, wherein the leaf spring comprises:
a joining portion that has the primary face that is joined to the suspension wire through the joining material, and that is provided with the joining material;
a connecting portion that protrudes from the outer edge of the joining portion;
an outer peripheral portion that surrounds the joining portion and the connecting portion, and to which one end of the connecting portion is joined; and
an arm portion that has a prescribed modulus of elasticity.

9. The lens driving device as set forth in claim 8, wherein: the position, in the circumferential direction of the outer peripheral portion, wherein the connecting portion is joined to the outer peripheral portion, is the position that is furthest from the position to which the arm portion is joined to the outer peripheral portion.

10. The lens driving device as set forth in claim 8, wherein: the modulus of elasticity of the connecting portion is greater than the prescribed modulus of elasticity of the arm portion.

11. The lens driving device as set forth in claim 8, wherein:
the joining portion has a through hole into which the suspension wire is inserted.

12. The imaging device comprising a lens driving device as set forth in claim 1.

13. The electronic device comprising a lens driving device as set forth in claim 1.

* * * * *

UNITED STATES PATENT AND TRADEMARK OFFICE
CERTIFICATE OF CORRECTION

PATENT NO. : 10,209,479 B2
APPLICATION NO. : 15/580203
DATED : February 19, 2019
INVENTOR(S) : Haruka Matsuhisa and Kenzo Imai It is certified that error appears in the above-identified patent and that said Letters Patent is hereby corrected as shown below:

On the Title Page

Item (30) Foreign Application Priority Data should read as:
Jun. 12, 2015 (JP).............2015-119836
Jun. 12, 2015 (JP).............2015-119837

Signed and Sealed this
Twenty-eighth Day of May, 2019

Andrei Iancu
*Director of the United States Patent and Trademark Office*